A. H. CRAWFORD.
Running Gear for Vehicles.

No. 229,237.  Patented June 29, 1880.

WITNESSES:
Wm C Raymond
E. Laass

INVENTOR:
A. Herbert Crawford
per Duell, Laass & Hey
Attorneys

UNITED STATES PATENT OFFICE.

A. HERBERT CRAWFORD, OF LIVERPOOL, NEW YORK.

RUNNING-GEAR FOR VEHICLES.

SPECIFICATION forming part of Letters Patent No. 229,237, dated June 29, 1880.

Application filed December 31, 1879.

*To all whom it may concern:*

Be it known that I, A. HERBERT CRAWFORD, of Liverpool, in the county of Onondaga, in the State of New York, have invented new and useful Improvements in Vehicles, of which the following, taken in connection with the accompanying drawings, is a full, clear, and exact description.

This invention has reference to that class of vehicles which have both axles pivoted vertically at their center and connected with each other by diagonal perches, so as to cause the hind wheels to follow the tracks of the forward wheels.

The invention consists in the combination, with the two axles of a vehicle pivoted to their respective bolster, of diagonal perches pivoted directly to said axles and formed with thill-couplings at their two extremities, substantially as hereinafter more fully described.

Figure 1:
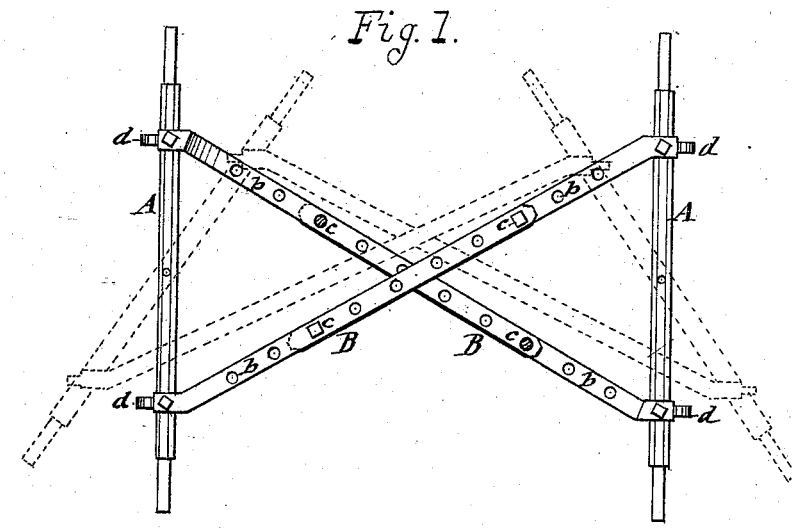
Figure 2:
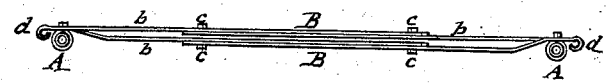

In the accompanying drawings, Figure 1 is a plan view of my invention, and Fig. 2 a side view of same.

Similar letters of reference indicate corresponding parts.

A A represent the axles, pivoted to their respective bolsters so as to allow them to swing in a horizontal plane. B B are the diagonal perches, made of two end sections, $b\ b$, lapped over each other back of the axles, and provided with a series of holes, through which bolts $c\ c$ pass and tie the said sections together. This arrangement allows the perches to be extended and contracted and the axles brought any desired distance apart.

The perches B B are pivoted directly to the axles at points in line with the central pivot of same, thus entirely preventing variation in the distance between the centers of the two axles and between the thereto-pivoted bolsters during the cramping or the turning of the axles on their king-bolt.

The extremities of the respective perches project over the axles and are formed into thill-couplings $d$, thereby saving the expense of an extra connecting-link between the thill-couplings and axles, and avoiding the rattling incident to a loose connection of the thill-coupling with the perches, as shown in my former invention.

Having described my improvement, what I claim as new, and desire to secure by Letters Patent, is—

In combination with the pivoted axles A A, the diagonal perches B B, pivoted directly thereto, and formed with the thill-couplings $d\ d$ at their extremities, substantially as shown and set forth.

In testimony whereof I have hereunto signed my name and affixed my seal, in the presence of two attesting witnesses, at Syracuse, in the county of Onondaga and State of New York, this 19th day of December, 1879.

A. HERBERT CRAWFORD. [L. S.]

Witnesses:
 E. LAASS,
 WM. C. RAYMOND.